United States Patent [19]

Axmear et al.

[11] Patent Number: 4,549,232

[45] Date of Patent: Oct. 22, 1985

[54] PHASE MODULATED SERVO SYSTEM

[75] Inventors: Frederick E. Axmear; David W. Collins, both of Rochester, Minn.

[73] Assignee: International Business Machines Corporation, Armonk, N.Y.

[21] Appl. No.: 507,647

[22] Filed: Jun. 27, 1983

[51] Int. Cl.[4] .......................... G11B 5/55; G11B 5/58
[52] U.S. Cl. ......................................... 360/77; 360/78
[58] Field of Search ........................... 360/77, 78, 135

[56] References Cited

U.S. PATENT DOCUMENTS 4,405,956  9/1983  Marshall ............................... 360/78
4,488,188  12/1984 Hansen et al. ......................... 360/77

OTHER PUBLICATIONS

IBM Technical Disclosure Bulletin, vol. 23, No. 2, Jul. 1980, pp. 787-789, Servo System for Magnetic Recording Based on Time Comparison, Gruss et al.

Primary Examiner—George G. Stellar
Attorney, Agent, or Firm—Robert W. Lahtinen

[57] ABSTRACT

In parallel track data storage systems, such as disk files, servo information is recorded using a plurality of constant frequency fields each having a phase shift between tracks. Servo information is thus encoded in the phase of the servo pattern instead of the amplitude of the servo signal lobes. Multiple phase shifts per track are used to make the signal constantly varying with transducer head displacement. Phase is measured modulo 360° such that the phase of a given field will go through 360° every M tracks. By using several fields having different values of M, coarse, medium and fine position resolution can be obtained with the same servo pattern and demodulation scheme. Further, using two fields, one field may be split and positioned at either side of the other field to provide a common center for both fields and eliminate error conditions due to factors such as speed variation.

15 Claims, 8 Drawing Figures

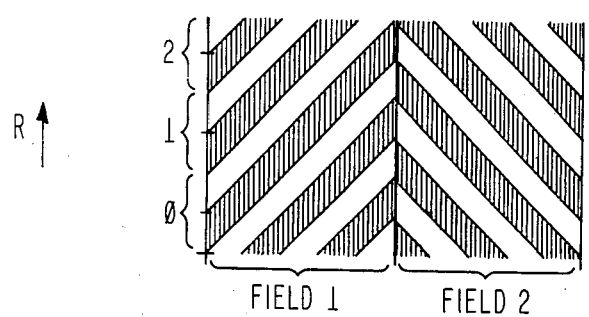
FIG. 1
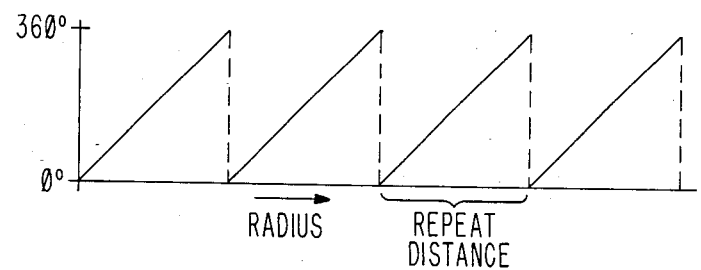
FIG. 2
FIG. 3
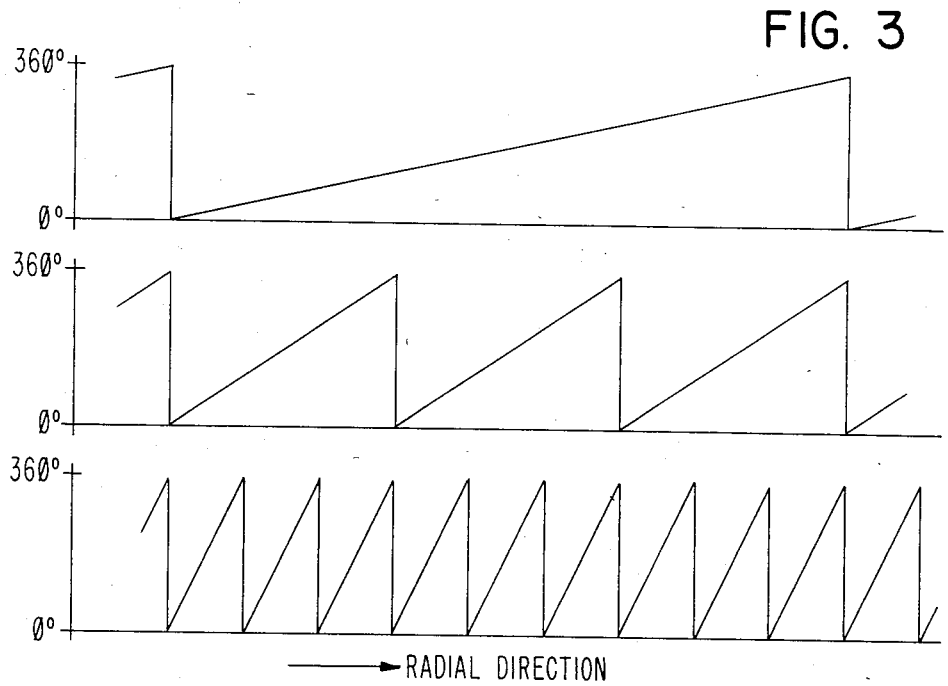

PHASE MODULATED SERVO SYSTEM

BACKGROUND OF THE INVENTION

This invention relates to transducer positioning and more particularly to phase modulated servo systems for accessing and following data tracks on a rotating medium.

The accepted method of determining transducer position is through an amplitude measurement of signals from adjoining servo tracks to generate a net signal indicative of the radial displacement from a predetermined track centerline. As track densities have increased, the capability of this technique has been enlarged by progressing from dibit to tribit to pentabit servo formats to increase the number of tracks in the capture area and enable more precise track identification. Any of these techniques has been susceptible to inaccuracy as a result of random electrical noise occurring during the servo signal window, and to mitigate this disability, the servo format has often used redundant signals which are averaged to obtain a more uniform approximation to the true value.

SUMMARY OF THE INVENTION

As shown and described, servo information is encoded in the phase of several constant frequency fields within the servo pattern. A linear phase change would be optimum, but practical limitations often require that a pattern be used that closely simulates a linear change relationship. As shown in a magnetic disk recording environment, the phase of each field changes by a fixed amount N times per track so as so approximate a linear change in phase with transducer radial position using a pattern which can be written with a conventional magnetic recording head. All of the variable phase servo fields are written with the same frequency so that the frequency response of the read/write head and the data channel will not effect the position error signals. The number of cycles within each field is arbitrary except that with more cycles it is possible to average the phase measurement over more transitions and reduce the influence of noise signals.

Phase is measured modulo 360°. The phase of a given field will go through 360° every M tracks. Several fields can be used having different values of M to obtain coarse, medium and fine position resolution with the same servo pattern and demodulation scheme.

This servo pattern is less susceptible to track-type dependent squeeze than previous servo patterns. Different frequency and phase contents of the signals written on odd or even tracks in the tribit servo pattern cause unpredictable amounts of squeeze between adjacent tracks. The pentabit servo pattern has four track types, each having different frequency and phase content.

Head to head variations in frequency response and off-track pickup make the squeeze difficult to control with these patterns. With the phase modulation servo pattern, the servo information is encoded at a single frequency so that frequency response of the head cannot affect the position error signal to first order. Also, the context for every field in the servo pattern is the same at every track position so that the off-track pickup from the sides of the read/write gap cannot cause squeeze between adjacent tracks. Since the amplitude of the off-track pickup is reduced rapidly as the frequency is raised, it is clearly advantageous to use many cycles at a fairly high frequency to minimize squeeze effects due to off-track pickup.

Because some types of read/write recording heads can pick up low frequency signals written on the disk over a much wider region than 1 track, it is important that no systematic coherent low frequency patterns be written into the servo patterns. If this is not done, then the analog servo signals end up riding on a base line which is not flat. With the phase modulation servo pattern, it is possible to write the servo pattern so that the magnetization of every magnet in the pattern is balanced by an equal length magnet immediately adjacent to it along the circumferential direction. Thus, the base line arising from the pickup at low frequency spanning many tracks will be flat and will not degrade the position measurement.

BRIEF DESCRIPTION OF THE DRAWING

FIG. 1 is a schematic showing of an optimum form of a phase shift servo pattern.

FIG. 2 is a schematic illustration to illustrate the repeat distance of 360° of phase shift difference related to radial displacement.

FIG. 3 is an illustration similar to FIG. 2 showing three scales of phase shift resolution.

DETAILED DESCRIPTION

Figure 4:
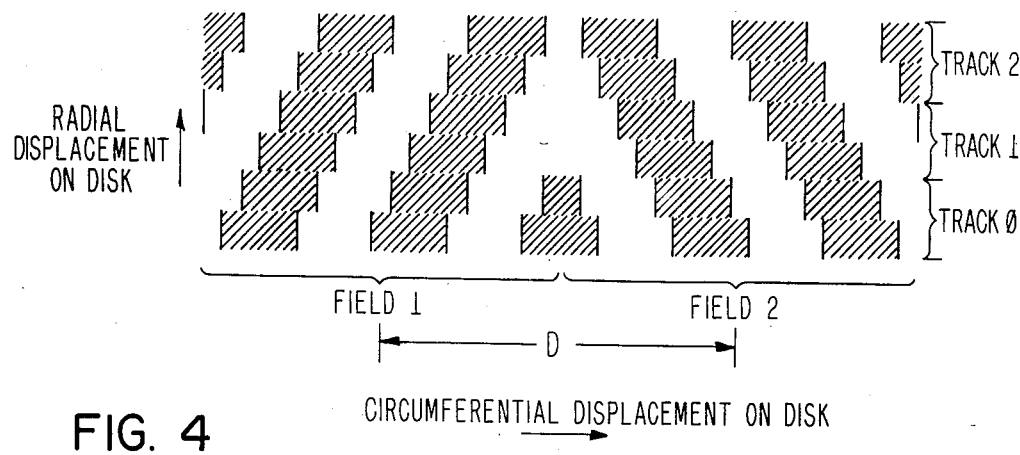
FIG. 4 illustrates a two field phase shift magnetic transition pattern.

In the servo device described herein, servo information is encoded in the phase of the servo pattern instead of the amplitude of the servo signal lobes. Further, the impact of random noise in the media has less influence when averaging many transitions rather than using one or a few peaks. Also amplitude should have reduced importance to render the automatic gain control (AGC) function less critical.

FIG. 1 shows an idealized phase shift servo portion with the concentric tracks represented horizontally and radial position represented as vertical movement. One polarity of the magnetic particles within the servo area is shown in the form of shaded portions with unshaded portions being the reverse polarity. The figure shows two fields written at the same frequency. Since the polarity has two transitions per track, a transducer head greater than half the track pitch will encounter a change of phase associated with radial displacement that changes both continuously and linearly with such radial displacement.

Also required is a clock or signal source running at the same frequency as the two fields and a means for detecting the phase of each field with respect to the clock. The phase difference between the fields gives the radial position of the transducer modulo some number of tracks, which number of tracks may be an integer or a non-integer. As illustrated in FIG. 2, the repeat distance may be any distance that equals 360° of phase difference. This distance in tracks is chosen with respect to the desired function subject to noise and hardware performance considerations. The use of three fields enables the use of three different repeat distances corresponding to the phase differences between various interfield differences, to allow the position to be unambiguously detected on three different scales of distance (coarse, medium and fine). For sector servo applications, these multiple degrees of resolution will be especially useful in seek mode.

Although the transition pattern shown in FIG. 1 is optimal in providing a continuous and linear phase change with radial movement of the transducer, the problems associated with writing the pattern make a modified form that provides good performance a more practical resolution of the problem. To produce the pattern of FIG. 1, it is most practical to use a special transducer head having slanted gaps. It is also necessary to precisely record the servo tracks to provide continuous transitions inclined to a radial line or transducer path.

However, it is not necessary that the pattern be written with slanted transitions in order to obtain good performance provided the head or channel filters out the third and higher harmonics of the signal frequency. With a head approximately two-thirds the width of a track, excellent position error linearity can be obtained with only half-track resolution in writing the patterns provided no more than 90° of phase shift per half track is used on any field in the pattern. This will allow each field to change by up to 180° per track for a total of 360° per track within two fields and writing one-half track patterns. A useful system for sector servo would also include a clock field for recognizing the start of the servo fields and a coarse servo field.

As seen in FIG. 4, the position error signal is encoded as a phase difference between two patterns written on the disk. FIG. 4 shows phase displacement of the pattern occurring each half-track. The phase displacement as shown is equal in both fields but occurs in opposite circumferential directions. The pattern shows a displacement D between the centers of the two fields whose phases are being compared.

The demodulator which processes the signal uses the signal produced by the magnetic recording head to determine the radial position of the head. The head signal consists of two periodic sequences of transitions produced as the head traverses the patterns of the two fields in the circumferential direction at almost constant radial displacement. The demodulator measures the relative phase difference between the average phase in field 1 and the average phase in field 2 by comparing both to a common reference clock whose transitions are coherent over both fields. This reference clock is obtained by dividing down a higher frequency crystal clock whose transitions are not necessarily synchronized with the transitions in the head signal. This lack of synchronization does not effect the result since the demodulator output consists of a difference of the phase of field 1 minus the phase of the reference and the phase of field 2 minus the phase of the reference. Thus the phase of the reference clock cancels out. However, if the frequency of the repetitive patterns within each field does not match the frequency of the reference clock then the output of the demodulator will not represent the actual phase shift between the two fields. The phase error in radians will be the product of the difference between the pattern and reference frequencies in radians per second times the displacement between the centers of the fields in meters divided by the disk surface velocity under the head in meters per second. The frequency differences causing the errors might arise from spindle speed variations between the time the signals were written on the disk surface and later read-back or from different frequencies being used to write and later demodulate the servo information.

Figure 5:
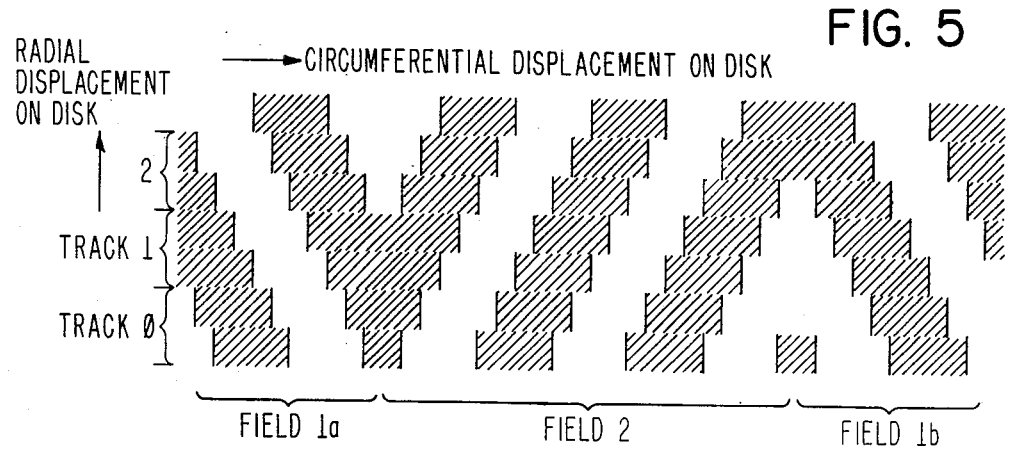
FIG. 5 is similar to FIG. 4, but modified to show a split field phase shift magnetic transition pattern used to eliminate speed variation errors.

This source of error may be greatly reduced by minimizing the effective displacement between the centers of the two fields. This is done by splitting one of the two fields into two subfields equally distant on either side of the other field. Thus the centers of mass of the two fields coincide causing the error term to vanish. The key is that the fields may be divided into multiple subfields and that it is the displacement between the centers of mass of the fields that determines the error. FIG. 5 illustrates the simplest pattern which reduces the error term to zero although clearly many other more complex patterns could be devised using the same principle. FIG. 5 shows a two field pattern wherein field 1 has been partitioned into subfields A and B which are respectively uniformly positioned before and after field 2. The centers of mass of the fields now coincide, and the phase error is eliminated.

Figure 6:
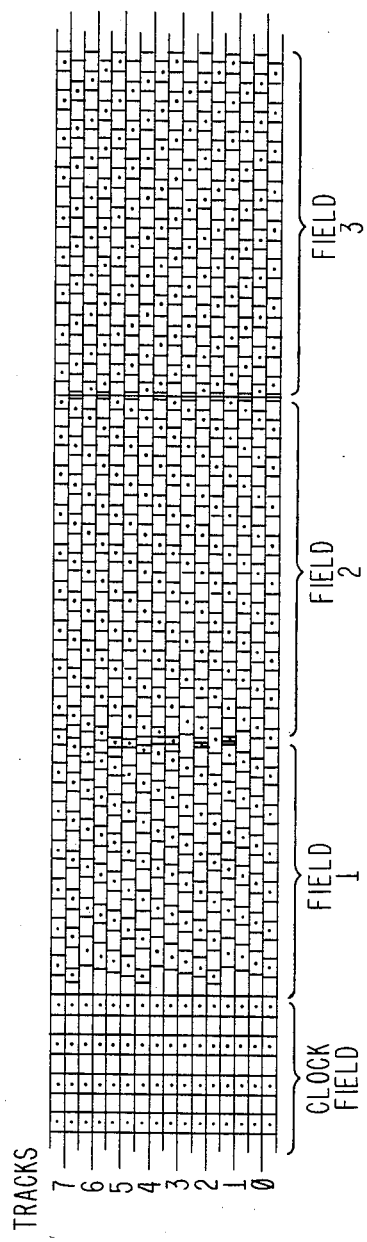
FIG. 6 shows a phase shift transition servo pattern over eight tracks using a clock field and three fields with varying phase shift patterns to obtain varying phase shift difference resolutions.
Figure 7:
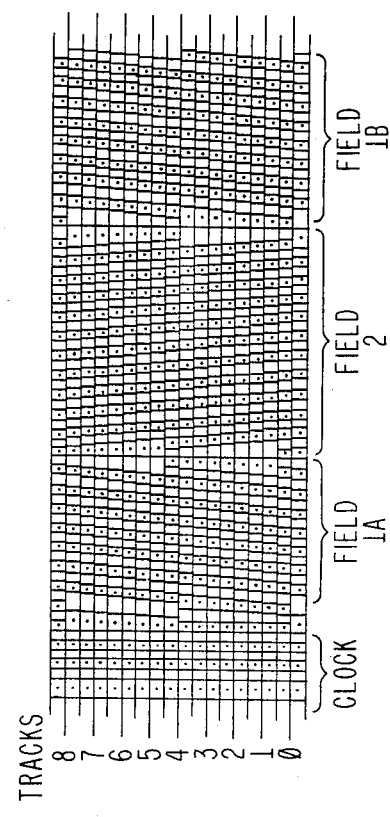
FIG. 7 shows a two field, eight track phase shift magnetic transition pattern wherein the splitting of one field results in a common center shared by the two fields.

FIG. 6 shows one possible implementation of a servo pattern for a file with the motor speed synchronized to a crystal clock, that is a known frequency. The showings of FIGS. 6 and 7 show rectangular areas having a half track width with one polarity shown by dotted rectangles and the opposite polarity as open rectangles. The clock field allows recognition of the boundaries of the remaining fields for gating. The phase difference between fields 1 and 2 repeats (360° of phase difference) every eight tracks for use in seek mode. The difference between fields 2 and 3 repeats every track for track follow error signal.

If this pattern were written at 2.5 megahertz it would require 11.2 microseconds. Depending upon the type of phase detection used an AGC field may or may not also be required. For track following 400 nanoseconds of phase error would be equivalent to one track. At 1,000 tracks per inch, one nanosecond error would be equivalent to 2.5 microinches. In fields 2 and 3, 16 transitions are available for timing the phase. Averaging of all of these individual phases would be good practice to reduce noise in the resulting position error signal.

An alternative embodiment to the showing of FIG. 6 would be to write the servo field patterns with a single phase transition per track which is accomplished by writing the servo using one pass per track. This would be simpler to execute during the servo writing operation, taking but half the time. However, since the product head that reads and writes data on the file is less than a full track pitch in width, regions of non-increasing signal during radial displacement would be encountered. The product head or transducer is normally between two-thirds and eight-tenths the track pitch or distance between adjacent track centerlines. When the transducer head moves half the head width from the track centerline, further radial movement causes no increase in the position error signal until the next phase shift is encountered. During this period of radial movement the position of the head is unknown beyond the fact that it is within the range of positions. To avoid this condition the phase shifted servo track portions should have a radial width no greater than the width of the transducer head.

The phase modulated servo technique is capable of a wide range of degrees of resolution through modification of the number of tracks during which the phase goes through 360° of phase shift in the various fields and the use of the initial clock field with unchanging phase as one of the fields used to obtain a phase difference value. In the disk servo environment it is valuable to have a low resolution over a large band of tracks and an intermediate resolution over a modest number of tracks for use in multi-track accesses and a high resolution pattern repeating each track for track following purposes. By such phase shift alterations in a servo using three phase shifted fields, a range of low, intermediate and high resolution can be readily produced such as 16 tracks, 4 tracks and 1 track or 64 tracks, 8 tracks and 1 track.

FIG. 7 illustrates the split burst approach to eliminate speed variation errors or irregularities wherein two phase shifted servo fields are used with common centers achieved by partitioning the first field into subfields disposed at opposite sides of the other field (field 2). This illustrates 360° over an eight track radial distance with the phase shifting in one-half track radial increments.

Figure 8:
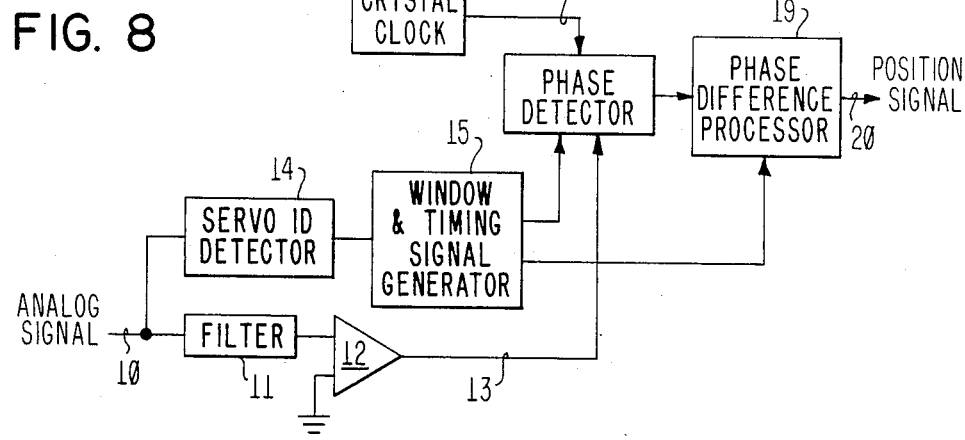
FIG. 8 is a block diagram of a demodulator for producing a position signal from detected phase differences.

FIG. 8 shows a typical phase demodulator for obtaining a position signal from two constant frequency servo fields having radially varying phase. The analog signal from the transducer head is received on line 10 and is converted by filter 11 and comparator 12 to a digital signal on line 13. The servo ID detector 14 identifies a servo sector, whereupon window and timing signal generator 15 creates the windows for the radially varying phase constant frequency servo fields. The crystal clock circuit 16 outputs a signal with the same frequency as the constant frequency servo fields. The phase of the crystal clock signal on line 17 is compared with the phase of the digital signal for each of the constant frequency servo fields and the difference between the compared values derived from the two fields is ascertained by the phase difference processor 19 to produce a position signal on line 20 which is indicative of the transducer position within the radial distance encompassed by 360° of phase difference.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A phase modulated servo for a disk file having rotating storage media presenting data surfaces and a transducer which is substantially radially moveable between track positions comprising:

two constant frequency fields recorded on a media data surface having differing, radially varying phase;

a source of pulses running at said constant frequency; and detecting means for detecting the phase of each of said two constant frequency fields with respect to the pulses generated by said source of pulses.

2. The phase modulated servo of claim 1 wherein each of said two constant frequency fields has numerous transitions, whereby the detected phase difference is an average over many transitions to provide a value less effected by random noise.

3. The phase modulated servo of claim 2 wherein one of said two constant frequency fields is divided into two subfields positioned at opposite circumferential sides of the other of said two constant frequency fields, whereby any error due to the displacement between the centers of the two fields are minimized or eliminated.

4. The phase modulated servo of claim 2 further comprising a third constant frequency field having a radially varying phase which differs from each of said two constant frequency fields; and said means for detecting also detects the phase of said third field with respect to said pulses from said source of pulses.

5. The phase modulation servo of claim 1 wherein said detecting means further ascertains the phase difference between said two constant frequency fields, which phase difference is indicative of the radial position of said transducer within the set of tracks encompassed by 360° of phase shift.

6. The phase modulation servo of claim 4 wherein said detecting means further ascertains a first phase difference between said two constant frequency fields and second and third phase difference of values between said third field and each of said two constant frequency fields to provide three phase difference values indicative of radial position.

7. The phase modulation servo of claim 6 wherein said first, second and third phase differences are each associated with a different number of tracks within 360° of phase shift, whereby one phase difference provides coarse position resolution, a second phase difference provides intermediate resolution, and the third phase difference provides fine resolution. The phase modulation servo of claim 1 wherein each of said constant frequency fields comprise radially varying transitions confronting said substantially radially moveable transducer head such that movement of said transducer causes a continuous change in the phase difference signal generated by said detecting means.

8. The phase modulation servo of claim 1 wherein each of said constant frequency fields comprise radially varying transitions confronting said substantially radially moveable transducer head such that movement of said transducer causes a continuous change in the phase difference signal generated by said detecting means.

9. The phase modulation servo of claim 8 wherein the radially varying phase of said constant frequency fields is effected by a recorded servo pattern that has a phase change at least two times per track.

10. The phase modulation servo of claim 8 wherein the phase change within said constant frequency fields varies linearly with radial movement of said transducer.

11. The phase modulation servo of claim 3 wherein said divided constant frequency field is equally divided and disposed symetrically at each side of the said other constant frequency field such that said divided field and said other field have a common center.

12. A phase modulated servo for a disk file having rotating storage media presenting data surfaces and a transducer which is substantially radially moveable between track positions comprising:

two fields recorded on a media data surface having transitions occurring at a common frequency;

said common frequency transitions having a radially varying phase with such radial variation being different in said two fields;

a source of pulses having transitions occurring at ssid common frequency; and detecting means for detecting the phase of the common frequency transitions in each of said two fields with respect to the common frequency transitions generated by said source of pulses.

13. The phase modulated servo of claim 11 wherein each of said two fields includes numerous common frequency transitions whereby the detected phase differences are an average over many transitions.

14. The phase modulated servo of claim 11 wherein one of said two fields is divided into two subfields positioned at opposite circumferential sides of the other of said two fields.

15. The phase modulated servo of claim 13 wherein said divided field is equally divided and disposed symetrically at each side of said other of said two fields such that the centers of said two fields are on a common radial line on the disk surface.

* * * * *